United States Patent [19]

Ehlschlager

[11] 3,829,620

[45] Aug. 13, 1974

[54] BI-DIRECTIONAL TRANSLATOR

[75] Inventor: Arthur John Ehlschlager, Columbus, Ohio

[73] Assignee: Western Electric Company, Incorporated, New York, N.Y.

[22] Filed: July 13, 1973

[21] Appl. No.: 379,060

[52] U.S. Cl. .............................................. 179/18 ET
[51] Int. Cl. .............................................. H04q 3/47
[58] Field of Search .................................. 179/18 ET

[56] References Cited

UNITED STATES PATENTS

| | | | |
|---|---|---|---|
| 3,235,664 | 2/1966 | Muroga et al. | 179/18 ET |
| 3,312,785 | 4/1967 | Fujinaka | 179/18 ET |
| 3,673,338 | 6/1972 | Ekbergh | 179/18 ET |

*Primary Examiner*—William C. Cooper
*Attorney, Agent, or Firm*—C. H. Davis

[57] ABSTRACT

A bi-directional translator is disclosed for translating directory numbers to equipment numbers and vice versa. A single relay tree has a directory number input and an equipment number input. Separate output circuits for the translated equipment number and the translated directory number are connected by a single cross connection to associate the equipment number with the directory number of a line. The output circuits are selectively connected to the tree depending on which input circuit is used.

15 Claims, 5 Drawing Figures

BI-DIRECTIONAL TRANSLATOR

FIELD OF THE INVENTION

This invention relates to a bi-directional translator arrangement for use in a telephone switching system for effecting translations in either direction between equipment numbers and directory numbers of the lines served by the switching system.

BACKGROUND OF THE INVENTION

Customer stations served by a telephone switching system are identified by directory numbers and equipment numbers. The directory number is usually publshed in a telephone directory and it is this number that is transmitted by a calling station to indicate the identity of the wanted customer. In contrast, the quipment number is assigned to the customer line and identifies the customer line circuit or the physical location within the switching system at which the customer line is connected to the line circuit apparatus.

The unrestricted assignment of both directory and equipment numbers in a telephone switching system is a most desirable feature. For instance, a customer may wish to retain the same directory number even though the customer moves to different parts of the exchange area or the customer changes his class of service necessitating a change in the type of line circuit being used. On the other hand, equipment numbers are changed for traffic engineering purposes so that traffic load may be spread out evenly over the various units of switching equipment.

When the calling line initiates a request for service, the calling line is first generally identified by its equipment number, but for billing purposes it is necessary to translate this equipment number into the directory number to which the calls are to be billed. When the called line's identity is received by the switching system it is generally in the form of directory number and before the switching equipment can establish a connection to the called line the directory number must be translated into an equipment number which identifies the line equipment of the called customer.

Many arrangements have been proposed for translating directory numbers to equipment numbers and vice versa, but these arrangements lack certain features which have been incorporated in the present invention.

Some of the more recent program-controlled translation arrangements utilize electrically alterable memories which have directory number lists and equipment number lists. In these systems a central processor performs a look-up fucntion in the appropriate lists to find the corresponding line or directory number. While these systems are suitable for their intended purpose, these systems are generally too expensive for the smaller switching systems.

In another well-known switching system, two translator frames are used. One frame translates directory numbers into equipment numbers and requires the placement of three cross-connection wires for each directory number. The equipment number to directory number translator requires the placement of an additional cross-connection wire through a plurality of detecting rings for each directory number. While the use of separate translators permits the simultaneous translation of both directory numbers and equipment numbers, numerous cross connections must be rearranged on both translator frames whenever either the directory number or equipment number changes.

Accordingly, it is one object of the present invention to provide a single and flexible bi-directional translator arrangement for a telephone switching system.

Prior art bi-directional translators are known which use a plurality of expansion circuits and counters. An expansion circuit, often referred to as a tree circuit, expands the received coded input into a one-out-of-n output. For example, if the decimal digits 2, 3 and 4 are received in the well-known two-out-of-five code, the tree circuit would expand this into a one-out-of-a-thousand indication with the output on a single code point designated "234".

Generally one tree circuit is provided for decoding directory numbers and one tree circuit is provided for decoding equipment numbers. The trees are cross-connected together to associate directory numbers with equipment numbers and a counter is associated with each tree. For a directory number to equipment number, the counter associated with the directory number tree is driven to the number to be translated. A second counter, associated with the equipment number tree, is then incremented until a match occurs due to the cross connections between the trees. When a match occurs the state of the second counter can be read to ascertain the translated output.

In a similar manner, the second counter can be driven to an equipment number input and the directory number can be determined by incrementing the first counter until a match occurs.

While these bi-directional translators are suitable for their intended purposes, they require a multiplicity of trees and counter circuitry to perform their translations.

It is, therefore, another object of the invention to simplify the cross connection and tree circuitry of a bi-directional translator arrangement.

SUMMARY OF THE INVENTION

These and other objects of the invention are attained with the one illustrative embodiment of the invention wherein a bi-directional translator having a single relay tree circuit is provided. The tree circuit has, associated therewith, both directory number and equipment number input means. Separate directory number and equipment number output circuits are also provided, and these output circuits are interconnected by a single cross-connection wire to associate the directory number and equipment number of a particular line. The output circuits are selectively actuated by the tree according to which input means was being used. Thus, if the directory number input means is energized the equipment number output circuit is actuated by the tree to provide the directory number to equipment number translation. On the other hand, if the equipment number input means is energized the directory number output circuit is actuated to provide the equipment number to directory number translation.

BRIEF DESCRIPTION OF THE DRAWING

A better understanding of the arrangement contemplated will be had with the following description made with reference to the drawing, in which.

DESCRIPTION OF OPERATION

A description of the operation of the bi-directional translator will now be given with respect to FIGS. 1–3 arranged according to FIG. 4.

For purposes of illustration let it be assumed that the translator is being used in a telephone switching system similar to that system shown in more detail in U.S. Pat. No. 2,585,904 to A. J. Busch of Feb. 19, 1952. In that patent there is disclosed a telephone switching system of the common control type having markers and senders for processing calls. On an intra-office call, the calling customer is connected to an originating register and dials the directory number of the called line. This called number is stored on the relays in the register in a well-known two-out-of-five code format. When sufficient directory number digits have been received, the register forwards the directory number to a marker such as marker 300 in FIG. 3 and the marker engages a translator to translate the directory number to an equipment number which identifies the line circuit associated with the called line.

In the example being described, let it be assumed that the marker received the directory number 1999 and wishes to translate this into the equipment number associated with that line. The marker then transmits the thousands, hundreds, tens and units digits of the directory number to the translator and stores these on the TH-, H-, T- and U- relays in that portion of the translator shown in FIG. 3. In this example, input register relays TH1, H2 and H7, T2 and T7 and U2 and U7 would be operated to register the four digit directory number 1999.

Figure 3:
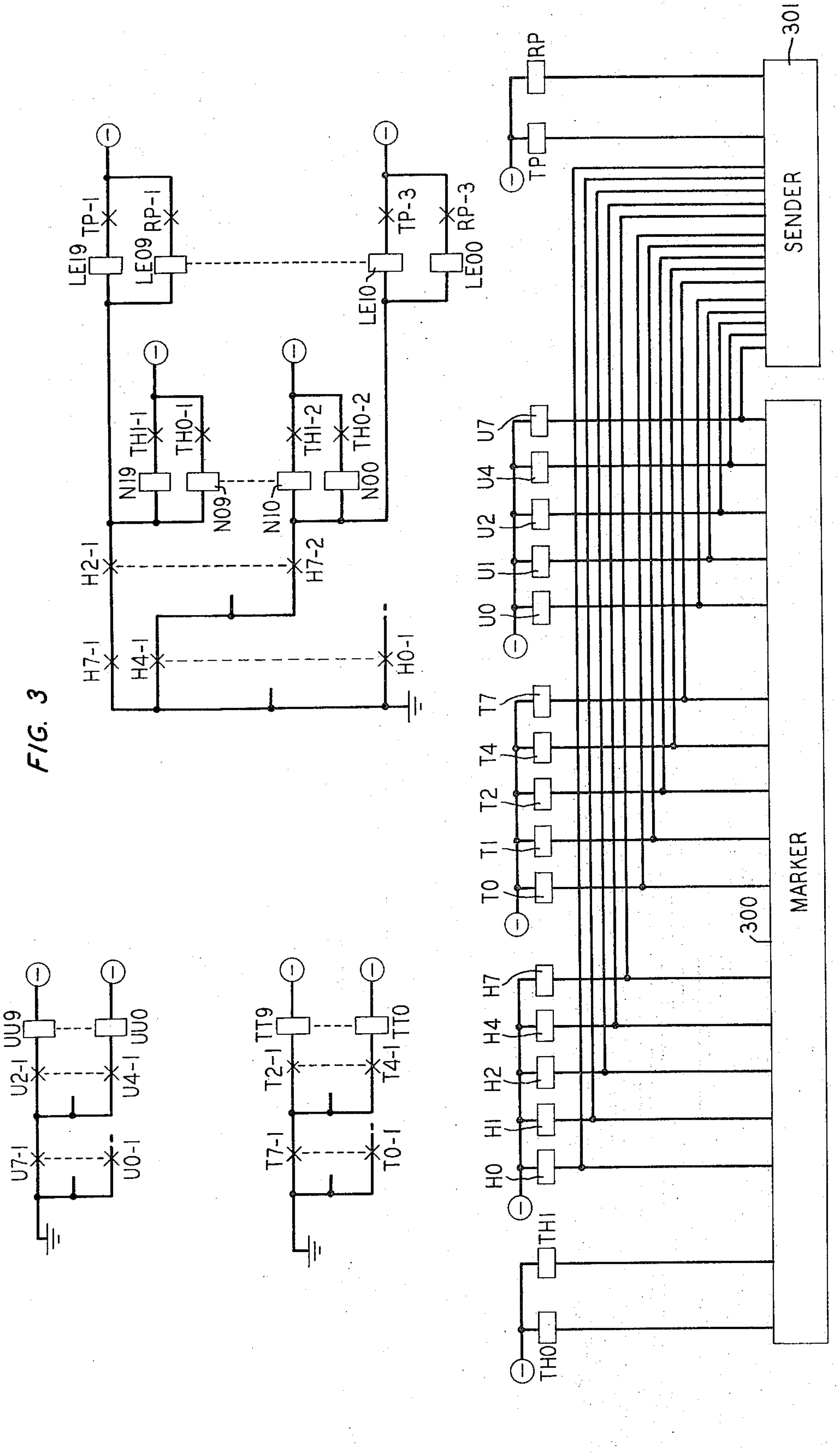

With relays U7 and U2 operated, a circuit is completed in FIG. 3 for operating units relay UU9 associated with the tree circuit. Similarly, with relays T7 and T2 operated a circuit is completed for operating tens relay TT9 associated with the relay tree.

A combination of the thousands and hundreds relays provide an operating path for one of the number relays N- which partially controls the energization of the appropriate output circuit. Thus, with relays TH1, H2 and H7 operated, a circuit is completed for operating number relay N19 in FIG. 3.

Figures 1, 4:
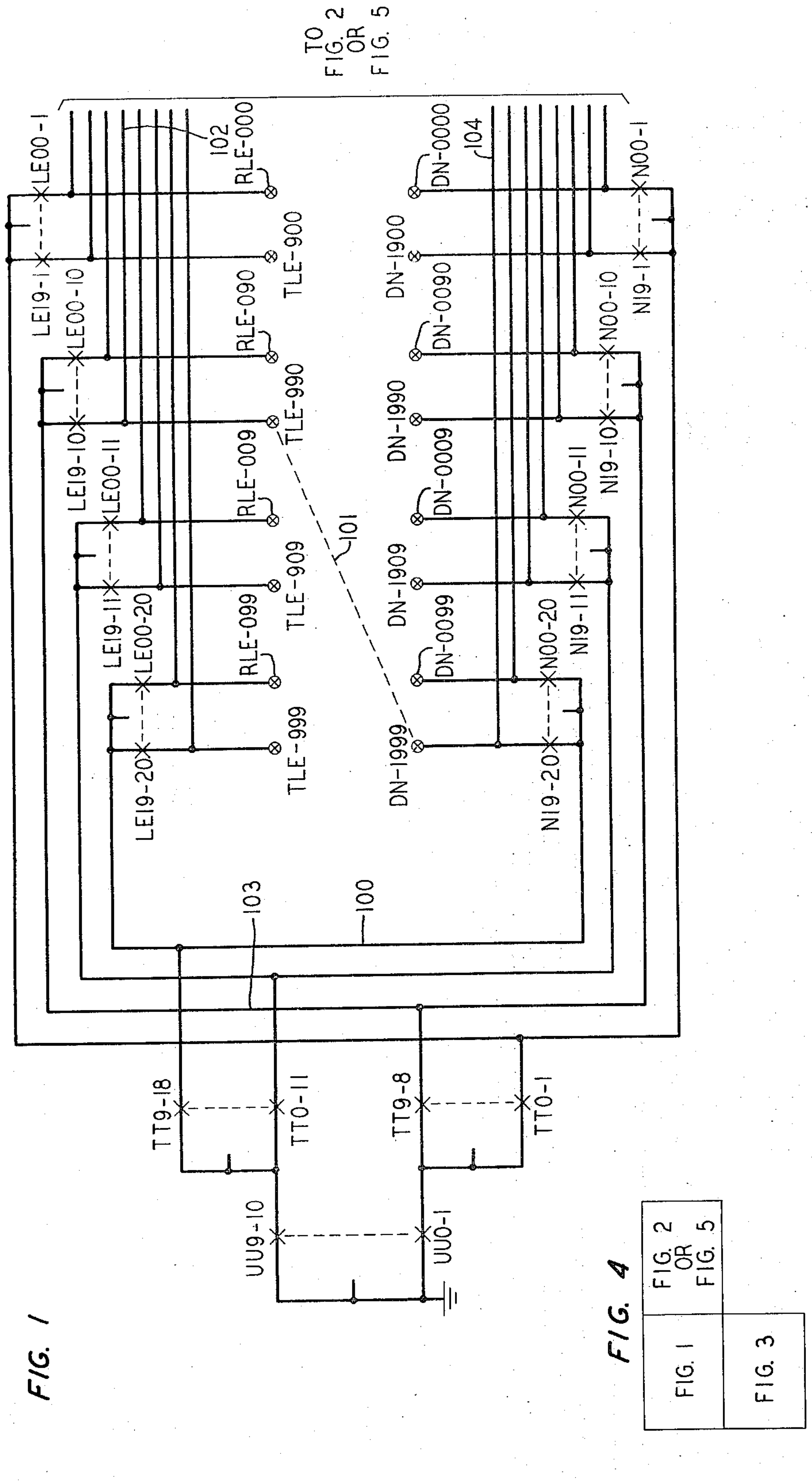
FIGS. 1, 2 and 3 when arranged according to FIG. 4 show one embodiment of the invention, with the input circuitry and part of the relay tree shown in FIG. 3, the remaining portion of the tree and part of the output circuitry shown in FIG. 1, and the remaining portion of the output circuitry shown in FIG. 2.

With the operation of relay N19 a circuit can be traced in FIG. 1 from ground through the contacts of the tree to the directory number output terminal DN-1999 associated with the directory number 1999. This circuit includes make contacts UU9-10, TT9-18, conductor 100 and make contacts N19-20 to cross-connection terminal DN-1999.

Let it be assumed that the equipment number 990 has been assigned to directory number 1999 and that directory number 1999 is a tip-party station on a two-party line. The equipment number 990 is a designation of one of the line circuits on a switch frame in the system and the association of the directory number to equipment number is accomplished by a single cross connection such as 101 which interconnects directory number terminal DN-1999 with equipment number terminal TLE-990. If this were a ring party on the same two-party line, cross connection 101 would be connected to a punching RLE-990 which has not been shown to simplify the drawing.

Figure 2:
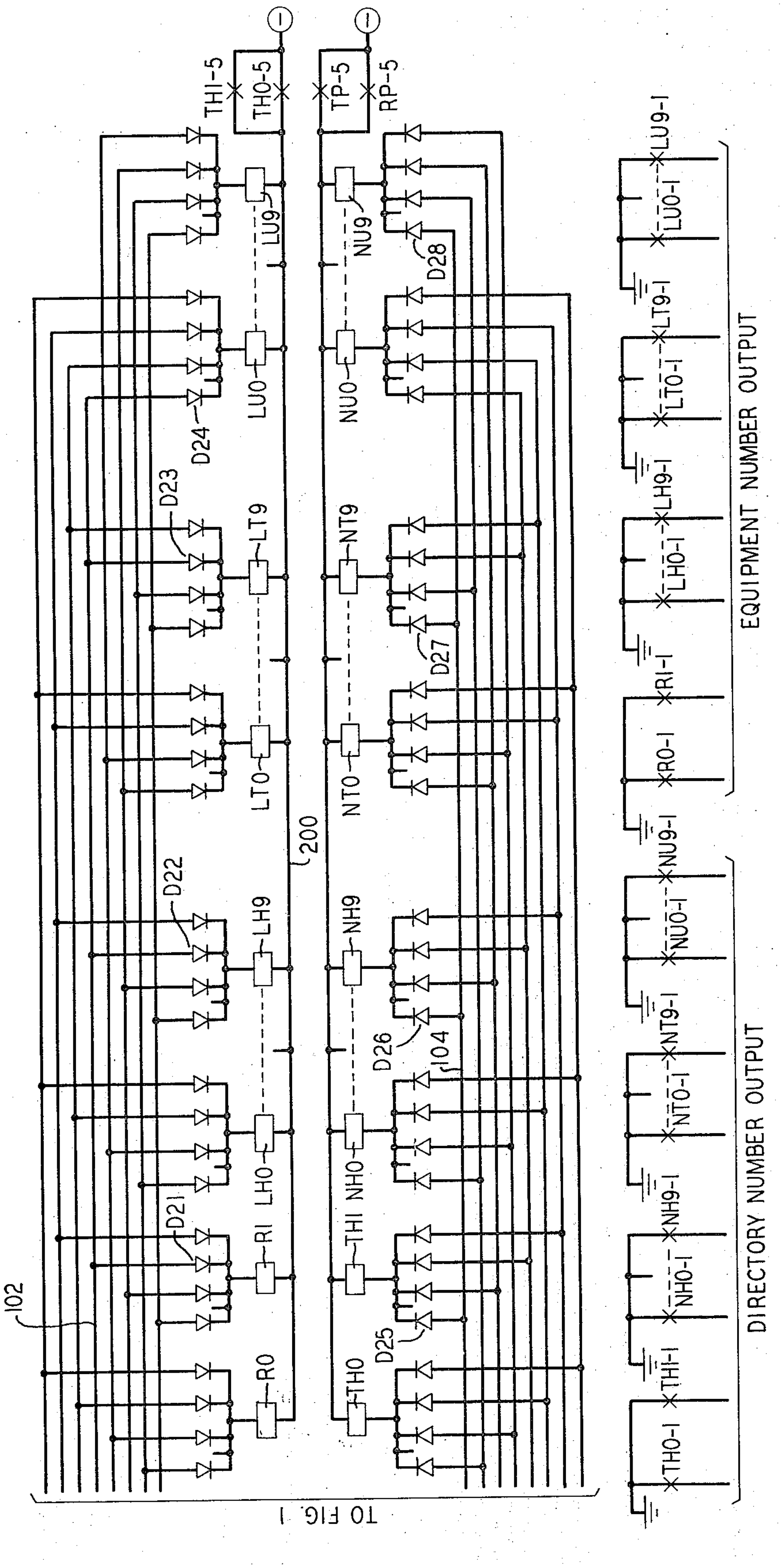

The ground extended over the previously traced path to terminal DN-1999 is extended over cross connection 101 in a forward direction to terminal TLE-990 and over conductor 102 to FIG. 2 through diode D21, the winding of relay R1, over conductor 200 and through make contacts TH1-5 to battery. Relay R1 operates indicating that this is a tip party and requires a particular type of ringing signal.

The ground on conductor 102 is also extended through the diodes D22, D23 and D24, the windings of line hundreds relay LH7, lines tens relay LT9 and line units relay LUO operating these three relays. In operating, these relays close their contacts shown in the lower right portion of FIG. 2 and these contacts transmit the equipment number 990 back to the marker 300. The marker then utilizes the line equipment identity to select the called line equipment and establish a connection from the calling line to the called line equipment number 990.

In summary, on the prior call the marker 300 indicated to the translator that it wished to effect a directory number to equipment number translation by actuating the thousands relay along with the hundreds, tens and units input information. These input register relays energize the tree circuit and actuate a number relay N19 to permit the proper output terminals of the tree to be energized. The output of the translator was then identified by the line hundreds, line tens and line units relays (LH-, LT-, and LU-) for use by the marker in completing the call, and the R- relay identified the type of ringing required to ring the called station.

On an outgoing toll call the calling line equipment number is used to establish a connection between the calling customer station and an outgoing trunk. This line equipment information is also forwarded to a sender which is attached to the trunk for outpulsing the called directory number. Since the sender has the calling line equipment number and the called directory number, the sender can be used to actuate the automatic message accounting system to record the billing for the above call. In this instance, the sender requests the translator to translate the calling equipment number into the directory number so that the call may be billed to the proper number.

Using the same customer line described above, it will be recalled that the equipment number 990 was associated with a party line having a tip party whose directory number is 1999. The sender 301 in FIG. 3 will then operate the input register tip party relay TP in FIG. 3 and the common input register hundreds, tens and units relays H2 and H7, T2 and T7, and U4 and U7.

With units relays U4 and U7 operated the path is completed for operating units relay UUO. A similar path is completed for operating relay TT9 with make contacts T7-1 and T2-1. The combination of tip party relay TP and hundreds relays H7 and H2 provide a path for operating line equipment relay LE19, and relay LE19 actuates the tree to provide the appropriate output signal on a terminal representing the equipment number. More specifically, ground in FIG. 1 is extended through make contacts UUO-1, TT9-8, over conductor 103, through make contacts LE19-10 to equipment number terminal TLE-990 and over cross connection 101 in the reverse direction to directory number terminal DN-1999 and over conductor 104 to FIG. 2. In FIG. 2 the ground on conductor 104 extends through diodes D25-D28 and the windings of relays TH1, NH9, NT9 and NU9 and through contacts TP-5 to battery. Relays TH1, NH9, NT9 and NU9 operate and transmit ground over their contacts in the lower portion of FIG. 2 to provide the switching system with the directory number output 1999.

From the above description it can be seen that the relay tree circuit responds to two inputs, namely, a four digit directory number or an equipment number comprising three digits and a party line indication. Depending on which input is received on set of output terminals (DN- or TLE-/RLE-) is connected to the tree while the operating circuits are partially completed for identification relays connected to the other output terminals. Ground is then transmitted over a single cross connection between directory number and equipment number output terminals depending on whether a directory number or an equipment number is to be translated.

Figure 5:
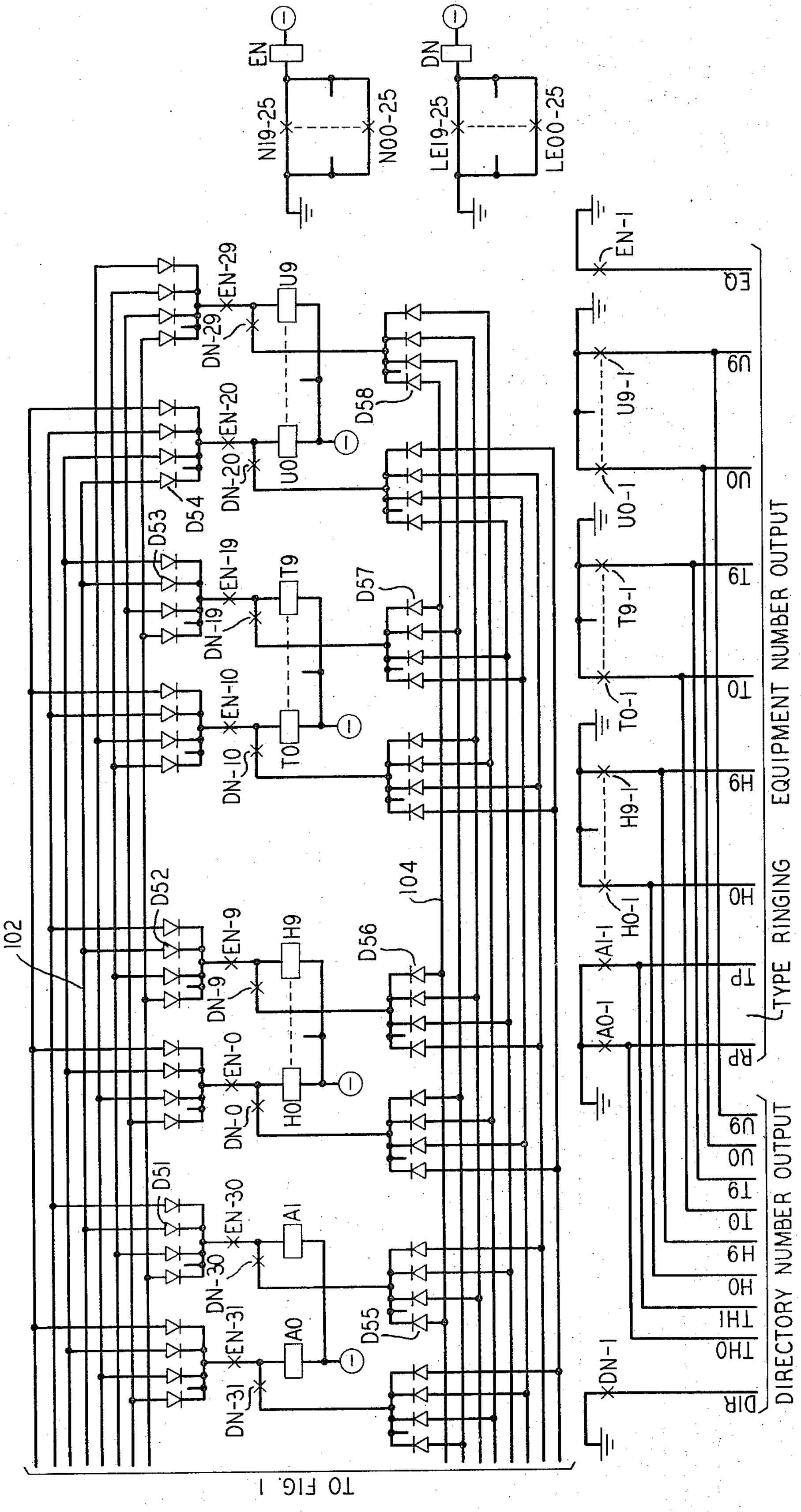
FIG. 5 shows an alternate embodiment of the output circuitry which can be used instead of FIG. 2 in an assembly of FIGS. 1, 5 and 3 according to FIG. 4.

FIG. 5 when arranged with FIGS. 1 and 3 according to FIG. 4 shows an alternate embodiment of the invention using a single set of output relays that are switched between the output terminals by relays ON and EN.

More specifically, when a directory number is to be translated as described above, relay N19 operates to complete a circuit in FIG. 5 for operating equipment number relay EN. Relay EN couples the diodes in the top portion of FIG. 5 to relays A-, H-, T-, and U-. If it is assumed that the ground is transmitted over the conductor 102 from FIG. 1 as in the prior example, the ground is transmitted through diodes D51, D52, D53 and D54 to actuate rèlays A1, H9, T9 and UO. Relays H9, T9 and UO indicate the equipment number is 990 and relay A1 indicates that the directory number is associated with a tip party line.

when the equipment 990 for a tip party is to be translated into a directory number, relay LE19 in FIG. 3 operates and closes its contacts LE19-25 in FIG. 5 to operate directory number relay DN. As in the above example ground was extended over conductor 104 through diodes D55, D56, D57 and D58 to actuate relays A1, H9, T9 and U9 thereby indicating a directory number of 1999.

While separate directory number and equipment number outputs are shown in FIGs. 2 and 5, in some systems it may only be necessary to provide a single output to the common control circuitry of the switching system. Under these circumstances the translator might provide the system with a secondary indication as to whether an equipment number or directory number output is being transmitted. For example, if a directory number is being translated and the switching equipment expects to receive an equipment number, relay EN is operated and at its contacts EN-1 in FIG. 5, ground is transmitted over conductor EQ to the common control thereby indicating that the output on the H-, T-, etc., conductors is an equipment number. Similarly, the ground through make contacts DN-1 in FIG. 5 would indicate to the common control that the number being received is a directory number.

It will be understood that the above-described arrangements are merely illustrative of the application and principles of the invention. Numerous other arrangements may be devised by those skilled in the art without departing from the spirit and scope of the invention.

For example, while the arrangements being described herein are capable of translating four digit numbers it will be obvious to those skilled in the art how the arrangement can be modified to translate numbers comprising more or less digits depending on the needs of the system.

Furthermore, although electromechanical relay apparatus has been shown, it will be obvious to those skilled in the art how this apparatus might be replaced by electronic components.

What is claimed is:

1. An arrangement for translating any directory number into any equipment number and vice versa comprising a single tree circuit having directory number input means and equipment number input means, first output means comprising directory number terminals, second output means comprising equipment number terminals, means for identifying any of said terminals, means for associating each directory number with each equipment number by cross connecting one of said directory number terminals with one of said equipment number terminals, first coupling means responsive to the actuation of said directory number input means for coupling said first output means to said tree circuit while rendering said identifying means effective under control of said second output means, and second coupling means responsive to the actuation of said equipment number input means for coupling said second output means to said tree circuit while rendering said identifying means effective under control of said first output means.

2. The invention defined in claim 1 wherein said identifying means a plurality of devices selectively operable to indicate the number associated with each said terminal.

3. The invention defined in claim 2 wherein said devices comprise a first group of bistable elements connected to said directory number terminals and a second group of bistable elements connected to said equipment number terminals.

4. The invention defined in claim 1 wherein said first coupling means comprises first relay means for connecting said directory number terminals to said tree circuit, and wherein said second coupling means comprises second relay means for connecting said equipment number terminals to said tree circuit.

5. The invention defined in claim 2 wherein said devices comprise a group of bistable elements, wherein said first coupling means comprises means for connecting said elements to said equipment number terminals, and wherein said second coupling means comprises means for connecting said elements to said directory number terminals.

6. A bi-directional translator for translating any directory number into any equipment number and vice versa comprising a first input register repsonsive only to the receipt of directory number information, a second input register responsive only to the receipt of equipment numer information, a common input register responsive to both equipment and directory number information, an expansion circuit actuated by said input registers for converting multi-digit coded information into a one-out-of-*n* output signal where *n* is a whole number, a plurality of directory number terminals, a plurality of equipment number terminals, means responsive to said output signal being present on one of said terminals for identifying the number of said terminal, means interconnecting any directory number terminal with any equipment number terminal to associate a directory number with an equipment number, first coupling means responsive to said first input register for coupling said directory number terminals to said expansion circuit to cause an output signal to be transmitted via said interconnecting means to one of said equipment number terminals, and second coupling means responsive to said second input register for coupling said equipment number terminals to said expansion circuit to cause an output signal to be transmitted via said interconnecting means to one of said directory number terminals.

7. The invention defined in claim 6 wherein each said input register comprises a plurality of register relays, wherein said expansion circuit comprises contacts actuated by said common input register relays, wherein said first coupling means comprises first steering relay means jointly operable by said first and said common input register relays, and wherein said second coupling means comprises second steering relay means jointly operable by said second and said common input register relays.

8. The invention defined in claim 7 wherein said first steering relay means includes contacts for connecting said directory number terminals with said expansion circuit contacts, and wherein said second steering relay means includes contacts for connecting said equipment number terminals to said expansion circuit contacts.

9. The invention defined in claim 6 wherein said interconnecting means comprises a single cross-connection wire between each directory number terminal and its associated equipment number terminal.

10. The invention defined in claim 6 wherein said identifying means comprises output relay means, and wherein is also provided first circuit means for energizing said output relay means in response to said first input register and second circuit means for energizing said output relay means in response to said second input register.

11. The invention defined in claim 10 wherein said output relay means comprises a first group of relays for identifying said equipment number terminals and a second group of relays for identifying said directory number terminals.

12. The invention defined in claim 10 wherein said relay means comprises a plurality of registration relays, a first steering relay operable under control of said first input register for connecting said registration relays to said equipment number terminals and second steering relay operable under control of said second input register for connecting said registration relays to said directory number terminals.

13. A bi-directional translator for translating any directory number into any equipment number and vice versa comprising a single tree circuit for converting multi-digit coded information into a one-out-of-n output signal where *n* is a whole number, a first group of terminals representing directory numbers and a second group of terminals representing equipment numbers, means responsive to said output signal being present on one of said terminals for identifying the number of said terminal, first input means operable in response to directory number information signals for actuatng said tree circuit, second input means operable in response to equipment number information signals for actuating said tree circuit, and means for controlling the connection of one of said first and second terminal groups to said tree circuit in accordance with the operation of said first and second input means.

14. The bi-directional translator set forth in claim 13 further comprising means for transmitting output signals from the one terminal group connected to said tree to the other terminal group disconnected from said tree.

15. The bi-directional translator set forth in claim 14 wherein said transmitting means comprises a cross-connection field having an individual cross connection to associate each directory number with its corresponding equipment number.

* * * * *